Patented Dec. 18, 1951

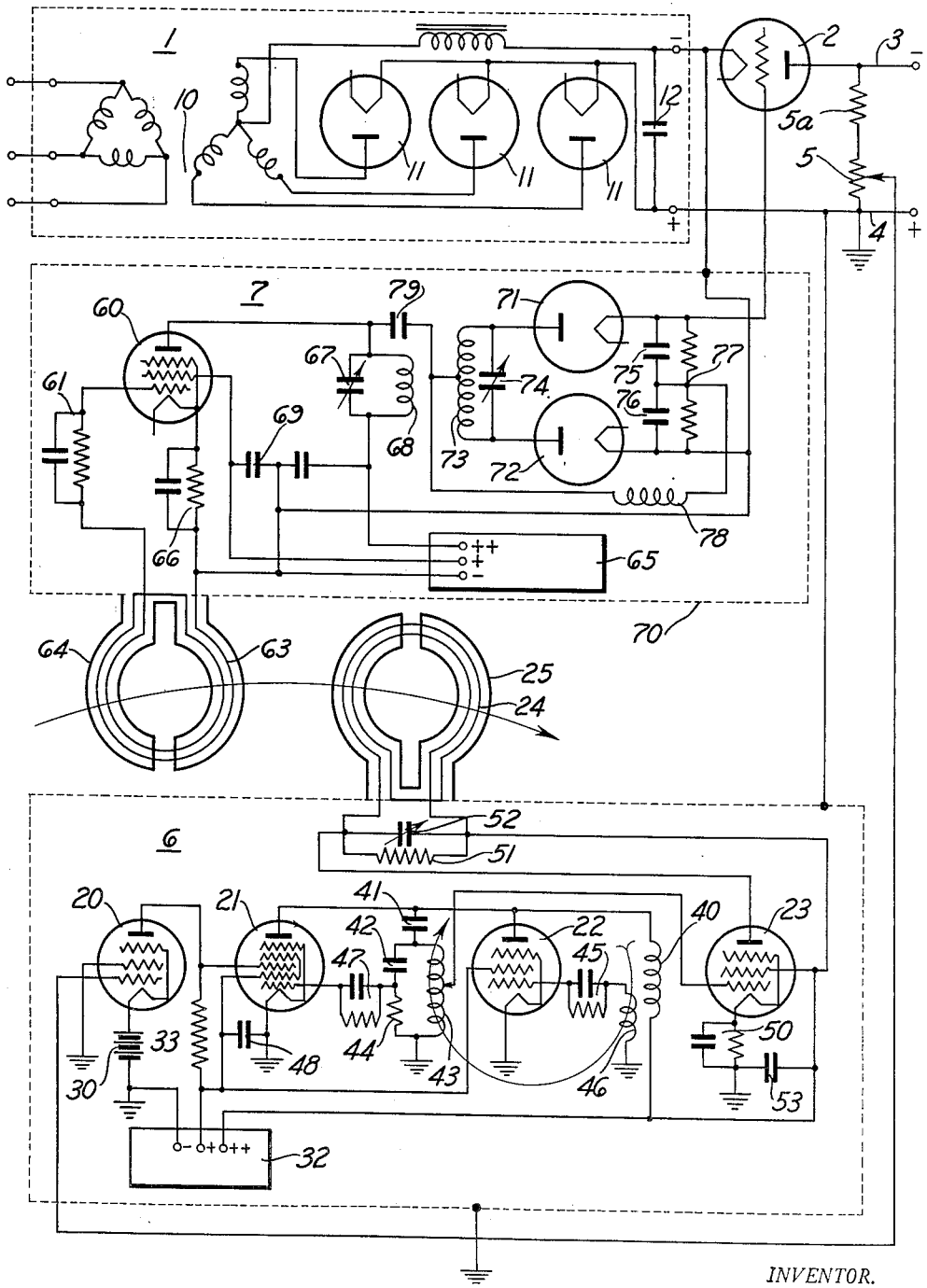

2,579,223

UNITED STATES PATENT OFFICE 2,579,223

REGULATED POWER SUPPLY

William R. Baker, Berkeley, Calif., assignor to the United States of America as represented by the United States Atomic Energy Commission Application June 27, 1945, Serial No. 601,804

10 Claims. (Cl. 323—22)

The present invention relates to electrical networks and it relates more particularly to an improved regulated high voltage power supply.

An object of the present invention is to provide a regulated high voltage power supply having a high degree of regulation.

Another object of the present invention is to provide a voltage regulated high voltage power supply having a high degree of regulation and characterized by high stability.

Still another object of the present invention is to provide a regulated high voltage power supply characterized by a high degree of regulation in the presence of sharp changes in the loading conditions.

A further object of the present invention is to provide a voltage regulated high voltage power supply wherein the regulation is performed at the ungrounded end of the power supply and the regulating sample voltage is derived at the low end of the regulated voltage supply output.

Still a further object of the present invention is to provide a regulated high voltage power supply employing frequency modulation in the regulating loop.

Still a further object of the present invention is to provide an improved arrangement for frequency modulating a radio frequency oscillator.

The invention, both as to its organization and method of operation, together with other objects and advantages thereof will best be understood by reference to the following specification taken in connection with the accompanying drawing which is a schematic diagram of a voltage regulated high voltage power supply embodying the features of the present invention.

Referring to the drawing there is illustrated a voltage regulated high voltage power supply employing the features of the present invention and broadly including a source of high direct-current voltage 1 of the order of 15 kilovolts and having its negative terminal connected through a regulating triode 2 of the 232B Western Electric type, to the output terminal 3 of the regulated power supply, the positive terminal of the high voltage source 1 being connected to the output terminal 4 of the regulated power supply which output terminal 4 is in turn grounded. A selected fraction of the output voltage is derived from a 50,000 to 100,000 ohm potentiometer 5 which is connected in series with a 2 megohm resistor 5a between the output terminals 3 and 4 the voltage being applied to the input of a frequency modulated transmitter 6, the frequency of the transmitter 6 being controlled by the voltage derived from the potentiometer 5 as will be hereinafter described. The mid-frequency of the transmitter 6 may be on the order of one-half megacycle with a frequency swing due to modulation of plus or minus 200 kilocycles. The frequency modulated transmitter 6 is inductively coupled to a receiver 7 of the frequency detecting type the output of the receiver 7 being in turn connected between the control grid and the cathode of the regulating triode 2.

More particularly, the high voltage source 1 includes a three-phase power transformer 10 having a delta-connected primary connected to a suitable source of three-phase current and a Y-connected secondary, the terminals of which are connected to the respective anodes of the diode rectifiers 11, the cathodes of the diode rectifiers being connected to the output terminal 4 of the power supply and grounded. Further, the center tap of the Y-connected secondary of the power transformer 10 is connected through a filter choke to the cathode of the regulating triode 2 the anode of the regulating triode 2 being connected to the output terminal 3, the cathode of the regulating triode 2 also being grounded through a filter condenser 12.

The transmitter 6 consists of a pre-amplifying input stage including the pentode 20 of the 6SJ7 type, a reactance tube frequency modulated oscillator including a multi-grid tube 21 of the 6AC7 type and the oscillator tube or pentode 22 of the 6SJ7 type and an amplitude limiting stage including a pentode 23 of the 6V6 or 6F6 type, the output of the pentode 23 being fed to a tuned coupling loop 24 surrounded by a split tubular electrostatic shield 25. More particularly, the cathode and suppressor grid of the pentode 20 are connected through a voltage standard battery 30 to ground and to the negative terminal of a suitable power supply 32. Moreover, the control grid of the pentode 20 is connected to the arm of the potentiometer 5 so that the voltage across the tapped portion of the potentiometer 5 is applied in series with a standard voltage 30 as the input signal to the pentode 20. The anode of the pentode 20 is connected through an anode resistor 33 to a midpoint positive terminal of a power supply 32 and is also connected to a control grid of the reactance tube 21.

The oscillator tube or pentode 22 has its anode connected through a radio frequency choke 40 to the high positive terminal of the power supply 32 and is also connected through a condenser 41 and a parallel resonant network including the series-connector capacitor 42, inductor 43, and resistor 44 of approximately 25 ohms, to ground, the junction point of the resistor 44 and inductor 43 being the grounded point of the resonance circuit network. Moreover, the control grid of the pentode 22 is connected through a parallel resistance-capacitance biasing network 45 and a tickler coil 46 to ground, the tickler coil 46 being inductively coupled in proper phase relationship to the inductor 43 whereby the pentode 22 will oscillate at a frequency as will be hereinafter set forth.

The reactance tube 21 is connected across the resonant network including the capacitor 42, the inductor 43, and the resistor 44, the anode of the tube 21 being connected through the capacitor 41 to the junction point of the capacitor 42 and the inductor 43 and the cathode of the tube 21 being grounded as is the junction point of the resistor 44 and the inductor 43. Moreover, the junction point of the capacitor 42 and the resistor 44 is connected through a grid biasing parallel resistance-capacitance network 47 to the control grid of the reactance tube 21. The screen grid of the reactance tube 21 is connected to the midpoint positive terminal of the power supply 32 and is grounded through a capacitor 48. Further, the anode of the reactance tube 21 is connected to the high positive terminal of the high power supply 32 through the radio frequency choke 40.

The output of the oscillator including the tube 22 is taken from a tap on the inductor 43 and impressed on the control grid of a limiting tube 23, the cathode of the limiting tube 23 being grounded through a cathode biasing parallel resistance-capacitance network 50. Moreover, the anode of the pentode 23 is connected through a broad band resonant network including the shunt connected resistor 51, variable capacitor 52 and coupling group 24 to the high positive terminal of the power supply 32. The screen grid of the pentode 23 is also connected to the high positive terminal of the voltage supply 32 and is grounded through a capacitor 53.

It should be noted that the entire transmitter 6 is completely housed in an electrostatic shield and a coupling coil 24 is surrounded by the split tubular electrostatic shield 25 as has been previously described.

Considering now the receiver network 7 a preamplifier and limiter stage including the pentode 60 of the 6L6 or 6F6 type has its control grid connected through a parallel resistance-capacitance network 61 to a terminal of the coupling loop 63 surrounded by the split tubular electrostatic shield 64, the coupling loop 63 being inductively coupled to the coupling loop 24 of a transmitter network 6. Moreover, the other terminal of the coupling loop 63 is connected to the negative terminal of a suitable floating power supply 65 and through parallel resistance-capacitance network 66 to the cathode and the suppressor grid of the pentode 60. Moreover, the anode of the pentode 60 is connected to the parallel resonant network including the variable capacitor 67 and the inductor 68 to the high positive terminal of the power supply 65. Further, the screen grid of the pentode 60 is connected to a midpoint of the power supply 65 and is grounded through a capacitor 69 to an electrostatic shielding 70 housing the receiver unit 7.

A discriminator network includes a pair of diode rectifiers 71 and 72 of the IV type having their anodes respectively connected to the terminals of a resonant parallel inductance-capacitance network including an inductor 73 and a variable capacitor 74, the inductor 73 being inductively coupled to the inductor 68. The cathodes of the diode rectifiers 71 and 72 are connected by a pair of series-connected capacitors 75 and 76 and by a center tap resistor 77, the center tap on the resistor 77 being in turn connected to the junction point of the capacitors 75 and 76 and through a radio frequency choke 78 to the center tap of the inductor 73 and thence through a capacitor 79 to the anode of the pentode 60 and to the upper end of the parallel resonant network including the variable capacitor 67 and the inductor 68. Further, the cathode of the diode rectifier 71 is connected to the control grid of the regulating triode 2 whereas the cathode of the diode rectifier 72 is connected to the cathode of the regulating triode 2.

Considering now the operation of the voltage regulator high voltage power supply illustrated, the output of the high voltage source 1 may be applied to a load through the regulating triode 2, a predetermined fraction of the voltage output of the regulated voltage supply being applied to the input of the pentode 20. An increase in the voltage output of the regulated voltage supply results in a negative signal being applied to the pentode 20 and in a positive signal output of the pentode 20 being applied to a control grid of the reactance tube 21. The voltage applied to the first control grid of the reactance tube 21 is derived from the resistor 44, the voltage on the resistor 44 leading the voltage across the resonant circuit including the resistor 44, the capacitor 42, and the inductor 43 by substantially 90°. Therefore, the current through the reactance tube 21 which is in parallel with the aforesaid resonant circuit leads the voltage across the tube 21 whereby the reactance tube 21 is in effect a capacitive reactance in parallel with the inductor 43, the effective value of the reactor determining the oscillative frequency of the oscillator tube 22, the value of the effective capacitive reactance of the tube 21 being determined by the voltage current ratio across the reactance tube 21 which in turn is controlled by the transconductance of the tube 21. Moreover, the transconductance of the tube 21 is controlled by the signal applied to the second control grid as derived from the output of the pentode 20. Therefore, a rise in the voltage output of the regulated power supply, followed by a positive signal being applied to the second control grid of the reactance tube 21 decreases the frequency of the output of the oscillator tube 22 inasmuch as the effective capacitive reactance of the tube 21 is increased. It should be noted that the resistor 44 serves a multifold purpose in that it presents a low impedance drive to the reactance tube 21, it provides the phase relationship required for the operation of the reactance tube 21, and it broadens the frequency response of the resonant circuit limiting the inductor 43 and the capacitor 42.

The output of the tube 22 is amplitude limited by the limiter tube 23 in order to minimize the effect of amplitude variations and the amplitude limited output is coupled through the coupling loops 24 and 63 to the second limiter stage in the receiver unit 7 including the pentode 60. The output of the pentode 60 is detected by the discriminator network including the diode rectifiers 71 and 72, the operation of this type of discriminator being well known, a rise in frequency being followed by the potential of the cathode of the diode rectifier 71 rising in a negative sense with respect to the cathode of the diode rectifier 72 whereby the control grid of the regulating triode 2 is driven in a negative sense with respect to the cathode of the regulating triode 2. The negative signal thus applied to the regulating triode 2 increases the resistance thereof, thereby urging the voltage across the output terminals 3 and 4 to its lower preset regulated value. Similarly, a drop in the voltage out of the regulated power supply between the output terminals 3 and 4 is followed by a positive signal being applied to the pentode 20 and a negative signal to the reactance tube 21, thereby increasing the frequency output of the oscillator tube 22. This increased frequency as detected by the discriminator network including the diode rectifiers 71 and 72 drives the grid of the regulating triode 2 more positive decreasing the resistance of the triode 2 and thereby increasing the voltage across the output terminals 3 and 4 and urging the voltage to its previously preset value.

It should be noted by varying the position of the arm of the potentiometer 5, thereby varying the fraction of the output voltage applied to the input of the pentode 20 the output voltage of the regulated power supply may be suitably adjusted.

While there has been described what is at present considered to be the preferred embodiment of the invention, it will be understood that various modifications may be made therein and it is intended to cover in the appended claims all such modifications as fall within the true spirit and scope of the invention.

What is claimed is:

1. A regulated high voltage power supply comprising a source of high direct-current voltage, a pair of output terminals, a regulating tube including an anode and a cathode and a control grid connected between said high voltage source and one of said output terminals, an oscillator frequency modulated in response to the voltage between said output terminals, a discriminator network coupled to the output of said oscillator, the output of said discriminator network being connected between the control grid and the cathode of said regulating tube.

2. A regulated high voltage power supply comprising a source of high direct-current voltage, a pair of output terminals, a regulating tube including an anode and a cathode and a control grid connected between said high voltage source and one of said output terminals, a frequency modulated oscillator modulated in response to the voltage between said output terminals, a first limiting network connected to the output of said oscillator, a second limiting network, said second limiting network being coupled to the output of said first limiting network, a discriminator network coupled to the output of said second limiting network, the output of said discriminator network being connected between the control grid and the cathode of said regulating tube.

3. A regulated high voltage power supply comprising a source of high direct-current voltage, a pair of output terminals, a regulating tube connected between said high voltage source and one of said output terminals, a frequency modulated oscillator modulated in response to the voltage between said output terminals, a first limiting network coupled to the output of said oscillator, a first coupling loop connected to the output of said first limiting network, a second coupling loop inductively coupled to said first coupling loop, a second limiting network having its input connected to said second coupling loop, a discriminator network connected to the output of said second limiting network, the output of said discriminator controlling the signal on the control grid of said regulating tube.

4. A regulated high voltage power supply comprising a source of high direct-current voltage, a first output terminal and a second output terminal, a regulating tube including an anode and a cathode and a control grid connected between said high voltage source and said first output terminal, a voltage dividing network connected between said output terminals, an oscillator, means for varying the frequency of said oscillator in response to the voltage across a portion of said voltage dividing network adjacent to said second output terminal, and means coupled to the output of said oscillator for controlling the signal on the control grid of said regulating tube in response to frequency variations of said oscillator.

5. A regulated high voltage power supply comprising a source of high direct-current voltage, a first output terminal and a second output terminal, a regulating tube including an anode and a cathode and a control grid connected between said high voltage source and said first output terminal, a voltage dividing network connected between said output terminals, an oscillator, means for varying the frequency of said oscillator in response to the voltage across a portion of said voltage dividing network adjacent to said second output terminal, a discriminating network coupled to the output of said oscillator, the output of said discriminating network being connected between the control grid and the cathode of said regulating tube.

6. A regulated high voltage power supply comprising a source of high voltage direct-current voltage, a first output terminal and a second output terminal, a regulating tube including an anode and a cathode and a control grid connected between said high voltage source and said first output terminal, a voltage dividing network connected between said output terminals, an oscillator frequency modulated in response to the voltage across a portion of said voltage dividing network adjacent to said second output terminal, a discriminator network coupled to the output of said oscillator, the output of said discriminator network being connected between the control grid and the cathode of said regulating tube.

7. A regulated high voltage power supply comprising a source of high direct-current voltage, a first output terminal and a second output terminal, a regulating tube including an anode and a cathode and a control grid connected between said high voltage source and said first output terminal, a voltage dividing network connected between said output terminals, a frequency modulated oscillator modulated in response to the voltage across a portion of said voltage dividing network adjacent to said second output terminal, a first limiting network connected to the output of said oscillator, a second limiting network being coupled to the output of said first limiting network, a discriminator network coupled to the output of said second limiting network, the output of said discriminator network being connected between the control grid and the cathode of said regulating tube.

8. A regulated high voltage power supply comprising a source of high direct-current voltage, a first output terminal and a second output terminal, a regulating tube connected between said high voltage source and said first output terminal, a voltage dividing network connected between said output terminals, a frequency modulated oscillator modulated in response to the voltage across a portion of said voltage dividing network adjacent to said second output terminal, a first limiting network coupled to the output of said oscillator, a first coupling loop connected to the output of said first limiting network, a second coupling loop inductively coupled to said first coupling loop, a second limiting network having its input connected to said second coupling loop, a discriminator network connected to the output of said second limiting network, the output of said discriminator controlling the signal on the control grid of said regulating tube.

9. A voltage regulator including means for connecting to a source of voltage to be regulated, means for connecting to a load, an adjustable impedance element comprising a thermionic discharge tube having an anode, a cathode, and at least one control electrode, the anode-cathode circuit of said tube being interposed serially between said voltage source connecting means and said loading connecting means, an adjustable frequency generator, means responsive to the voltage across said load connecting means for controlling the frequency of said generator, and adjustable bias voltage means for said control electrode of said tube responsive to variation of said generator frequency for adjusting said serially-connected adjustable impedance for regulating the voltage applied to said load.

10. A voltage regulator including means for connecting to a source of voltage to be regulated, means for connecting to a load, an adjustable impedance element interposed serially between said voltage source connecting means and said load connecting means, an adjustable frequency generator, means responsive to the voltage across said load connecting means for controlling the frequency of said generator, frequency discriminator means coupled to said adjustable frequency generator for deriving control signals characteristic in magnitude of said generator frequency, and means for applying said control signals to said impedance element for adjusting the serially-connected adjustable impedance thereof for regulating the voltage applied to said load.

WILLIAM R. BAKER.

REFERENCES CITED

The following references are of record in the file of this patent:

UNITED STATES PATENTS

| Number | Name | Date |
| --- | --- | --- |
| 2,197,934 | Koch | Apr. 23, 1940 |
| 2,268,790 | White et al. | Jan. 6, 1942 |
| 2,274,365 | Gardiner | Feb. 24, 1942 |
| 2,383,848 | Crosby | Aug. 28, 1945 |